(12) United States Patent
Sander et al.

(10) Patent No.: US 8,920,698 B2
(45) Date of Patent: Dec. 30, 2014

(54) PRODUCTION METHOD FOR A WORKPIECE COMPOSED OF A FIBRE-COMPOSITE MATERIAL

(75) Inventors: Peter Sander, Bremen (DE); Hans Marquardt, Fredenbeck (DE); Hauke Lengsfeld, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 933 days.

(21) Appl. No.: 12/310,113

(22) PCT Filed: May 4, 2007

(86) PCT No.: PCT/EP2007/054366
§ 371 (c)(1),
(2), (4) Date: Sep. 28, 2009

(87) PCT Pub. No.: WO2008/019894
PCT Pub. Date: Feb. 21, 2008

(65) Prior Publication Data
US 2010/0015405 A1     Jan. 21, 2010

Related U.S. Application Data

(60) Provisional application No. 60/838,241, filed on Aug. 17, 2006, provisional application No. 60/881,613, filed on Jan. 22, 2007.

(30) Foreign Application Priority Data

Aug. 17, 2006   (DE) .......................... 10 2006 038 666
Mar. 30, 2007   (DE) .......................... 10 2007 015 516

(51) Int. Cl.
*B29C 70/34*   (2006.01)
*B29C 37/00*   (2006.01)
*B29C 70/52*   (2006.01)

(52) U.S. Cl.
CPC ............. *B29C 37/0075* (2013.01); *B29C 70/34* (2013.01); *B29C 70/525* (2013.01)
USPC ........................................................ 264/257

(58) Field of Classification Search
None
See application file for complete search history.

(56) References Cited

U.S. PATENT DOCUMENTS 4,151,031 A    4/1979   Goad et al.
4,362,588 A   12/1982   Anton et al.
(Continued)

FOREIGN PATENT DOCUMENTS

DE      3145153     6/1983
DE     10014376     7/2001
(Continued)

OTHER PUBLICATIONS

First German Office Action for DE 10 2006 038 666.6 dated Apr. 3, 2007.
(Continued)

*Primary Examiner* — Benjamin Schiffman
(74) *Attorney, Agent, or Firm* — Jenkins, Wilson, Taylor & Hunt, P.A.

(57) ABSTRACT

The present invention relates to a production method for a workpiece (15) composed of a fibre-composite material, having the following steps: at least one support means (3) is provided. A main material (6) composed of a pre-impregnated fibre semi-finished product and/or of a secondary material (7) are/is applied to the at least one support means (3) in order to form at least two blank-mould areas (1, 10), in such a manner that at least one of the at least two blank-mould areas (1, 10) has the main material, and at least one of the blank-mould areas (1, 10) has the secondary material. The blank-mould areas (1, 10) are pressure-bonded to one another to form a workpiece blank (14) such that the at least one support means (3) is provided on a surface of the workpiece blank (14). The at least one support means (3) and the secondary material (7) are removed from the workpiece blank (14) in order to form the workpiece (15).

9 Claims, 13 Drawing Sheets

(56) References Cited

U.S. PATENT DOCUMENTS

| | | | |
|---|---|---|---|
| 4,440,593 | A | 4/1984 | Goldsworthy |
| 5,055,242 | A | 10/1991 | Vane |
| 5,716,487 | A | 2/1998 | Sumerak |
| 6,024,555 | A * | 2/2000 | Goodridge et al. ............ 425/394 |
| 6,245,275 | B1 * | 6/2001 | Holsinger ..................... 264/257 |
| 6,696,009 | B2 * | 2/2004 | Davis ........................... 264/510 |
| 7,186,361 | B2 * | 3/2007 | Kasai et al. .................... 264/137 |
| 7,807,005 | B2 * | 10/2010 | Rubin et al. ................... 156/200 |
| 2012/0148802 | A1 | 6/2012 | Bechtold |

FOREIGN PATENT DOCUMENTS

| | | |
|---|---|---|
| DE | 69913737 | 12/2004 |
| EP | 0284848 | 10/1988 |
| EP | 1504880 | 2/2005 |
| GB | 2041489 | 9/1980 |
| JP | S54-080372 | 6/1979 |
| JP | 402178023 | 12/1989 |
| JP | 402178023 | 7/1990 |
| JP | 2002-534295 | 8/2000 |
| JP | 2008-179130 | 8/2008 |
| JP | 2008-213311 | 9/2008 |
| RU | 2099189 | 12/1997 |
| WO | WO 00/47397 | 8/2000 |
| WO | WO2008019894 | 2/2008 |
| WO | WO2008019894 A4 | 2/2008 |

OTHER PUBLICATIONS

Second German Office Action for DE 10 2006 038 666.6 dated Jun. 12, 2008.
First German Office Action for DE 10 2007 015 516.8 dated Oct. 1, 2007.
Second German Office Action for DE 10 2007 015 516.8 dated Jan. 28, 2008.
International Search Report for EP07054366 dated Sep. 6, 2007.
Notice of Publication for U.S. Appl. No. 13/359,556 dated Jun. 14, 2012.
Japanese Office Action for Serial No. 2009-524144 dated Oct. 2, 2012.
Russian Decision to Grant for app No. 2009107010/05(009421) dated May 11, 2011.
Non-Final Office Action for U.S. Appl. No. 13/359,556 dated Apr. 11, 2014.
Notice of Allowance for U.S. Appl. No. 13/359,556 dated Apr. 23, 2014.

* cited by examiner

PRODUCTION METHOD FOR A WORKPIECE COMPOSED OF A FIBRE-COMPOSITE MATERIAL

FIELD OF THE INVENTION

The present invention relates to a production method for a workpiece composed of a fibre-composite material, and to a corresponding apparatus which, in particular, can carry out the production method according to the invention.

Although the present invention is described in the following text on the basis of a problem relating to the production of load-bearing structures in an aircraft, the present invention is not restricted to this but in general relates to the production of workpieces composed of fibre-composite materials, in particular elongated workpieces.

BACKGROUND OF THE INVENTION

Fibre-composite materials have been proven for the production of an aircraft owing to their high tensile strength and low intrinsic weight. In addition to flat elements such as those in the outer envelope, elongated elements, for example so-called stringers, are formed from fibre-composite materials. Stringers with a constant profile cross section can be produced by means of a continuous-flow method.

Stringers with different cross sections are required in an aircraft. This requires the provision of different tools in order to facilitate the wide range of differently shaped stringers. Furthermore, stringers are required whose profile varies along the length of the stringer. Until now, stringers with a constant profile cross section have been adapted by manual work by application of additional individual layers composed of composite material, manually. The quality of stringers produced in this way is only of an average level, and the method is complex.

SUMMARY OF THE INVENTION

One of the objects of the present invention is to provide a production method as well as an apparatus by means of which workpieces can be produced from a fibre-composite material, which can have a wide range of profile cross sections and can be produced using a single tool. The production process may be carried out as a continuous production process.

Accordingly, a production method for a workpiece composed of a fibre-composite material, includes the following steps:
(a) providing at least one support means;
(b) fitting of a main material composed of a pre-impregnated fibre semi-finished product and of a secondary material to the at least one support means in order to form at least two mould-blank areas in such a manner that at least one of the mould-blank areas comprises the main material and at least one of the mould-blank areas comprises the secondary material;
(c) pressure-handing of the at least two mould-blank areas to one another to form a workpiece blank in such a manner that the at least one support means is provided on a surface of the workpiece blank; and
(d) removing at least one support means and of the secondary material from the workpiece blank in order to form the workpiece,
wherein the main material and/or the secondary material are/is each applied with a thickness such that the thickness of the mould blank is formed constantly.

The production method according to claim 1 of the invention provides the following steps for this purpose:
(a) provision of at least one support means;
(b) fitting of a main material composed of a pre-impregnated fibre semi-finished product and/or of a secondary material to the at least one support means in order to form at least two blank-mould areas in such a manner that at least one of the blank-mould areas has the main material and at least one of the blank-mould areas has the secondary material;
(c) pressing of the at least two blank-mould areas against one another to form a workpiece blank in such a manner that the at least one support means is provided on a surface of the workpiece blank; and
(d) removal of the at least one support means and of the secondary material from the workpiece blank in order to form the workpiece.

The workpiece is formed from the main material, by means of the production method.

The production method according to the invention matches the cross section of the workpiece to the cross section of a tool by means of the secondary material. The workpiece blank may have a constant cross section, which is predetermined by the tool, over its entire length.

The secondary material may be chosen such that it has similar mechanical characteristics to the pre-impregnated fibre semi-finished product, at least for the purposes of the prevailing conditions when the blank moulds are joined together, that is to say at the appropriate pressure and the appropriate temperature.

The at least two blank-mould areas can be arranged integrally on a blank mould. The blank mould can then be folded or slotted in the longitudinal direction for pressure-bonding. Each blank-mould area can likewise be arranged on an individual blank mould, that is to say each blank-mould area corresponds precisely to a blank mould.

According to one embodiment a plurality of layers composed of a pre-impregnated fibre-composite material and/or the secondary material are applied in a third area of the support means in such a manner that no layer composed of the main material is covered by a layer composed of the secondary material. This ensures that the secondary material is arranged along the surface of the workpiece blank that is produced, and that the secondary material can subsequently be completely removed. Furthermore, this allows areas of any desired thickness or strength to be produced from the main material in the workpiece.

One embodiment provides for the main material and/or the secondary material to be applied with a thickness which is in each case such that the thickness of the blank-mould areas is homogeneous.

The pre-impregnated fibre semi-finished product may be a woven fabric, a knitted fabric and/or a scrim. The fibre semi-finished product for this purpose may have fibres which are oriented at right angles to one another. According to one embodiment, the scrim is formed from an even number of individual layers, in whose odd-numbered individual layers first fibres are aligned in a first direction and in whose even-numbered individual layers second fibres are aligned in a second direction, with the first direction being inclined at an angle of between 30° and 60° to the second direction. The first direction of all of the odd-numbered individual layers is the same, and the second direction in the immediately successive odd-numbered individual layers is arranged with mirror-image symmetry with respect to the first direction.

The support means may be a film.

The pre-impregnated fibre semi-finished product may comprise carbon fibres.

The secondary material may comprise a half-mould with glass fibres.

According to one embodiment, before the pressure-bonding process, one of the first of the blank moulds is arranged parallel to a second of the blank moulds, and these two blank moulds are then pressure-bonded to one another.

One embodiment provides for the first blank-mould area and the second blank-mould area to be pressure-bonded corresponding to a curve.

According to one embodiment, the first blank-mould area is produced with a first length and the second blank-mould area is produced with a second length, with the first length corresponding to the length of the first blank-mould area after the pressure-bonding process, and with the second length corresponding to a length of the second blank-mould area after the pressure-bonding process. In the case of the curve, the distinction is therefore drawn between the first length and the second length. This results in the workpiece being produced without stresses. In particular, this avoids compression of fibres in the fibre semi-finished products.

An inventive apparatus for production of a workpiece composed of a fibre-composite material, the apparatus includes:
  a supply device for provision of at least one support means;
  a laying device for application of a main material composed of a pre-impregnated fibre semi-finished product to at least one first area of the support means, and for application of a secondary material to at least one second area of the at least one support means, in order to form at least two mould-blank areas;
  a moulding press for pressure-bonding of the two mould-blank areas to form a workpiece blank; and
  a separating device for removal of the secondary material from the workpiece blank.

The moulding press may have a sequence of moulding segments which are arranged opposite one another in pairs and can be arranged along a predetermined curve for a state of the moulding press in which force is applied. The flexible arrangement of the moulding segments allows any desired curvature and shape of the workpiece along its longitudinal direction.

One embodiment provides for at least two feed devices to be provided, which supply two blank moulds parallel to the moulding press, in which case a first speed for the first feed device and a second speed for the second feed device can be adjusted as a function of the curvature of the predetermined curve.

Also provided is a method for production of a plastic fibre-composite component in the form of a profile with a profile cross section which varies over the length, using the pultrusion process, in which a basic profile and the varying profile cross section are formed from one or more material layers, which are continuous over their length, of a fibre material, by means of one or more further material layers which are applied to the basic profile and are connected to it, and with a length which occupies only a portion of the length of the profile, with the pultrusion process including supply, pressure-bonding and curing of the material layers, wherein the further material layers which form the varying profile cross section of the composite component are applied with the inter-position of a separating layer to the continuous material layers which form the basic profile, together with at least one compensation layer which supplements the profile cross section over that portion of the length of the profile which is not occupied by the further material layers to form a constant cross section, and wherein the at least one compensation layer is removed after the pressure-bonding process.

The so-called pultrusion process is nowadays a method of choice for the production of plastic fibre-composite components when the aim is to produce profiles with a constant profile cross section over their length. In the method, typically continuous material layers are stored wound up as a prefabricated scrim on rolls in the form of prepreg materials, a plurality of them are joined together, and they are pressure-bonded to one another under the influence of pressure and heat. The composite component obtained after solidification has high strength, and the production process costs little and is effective.

If, for example because of static requirements to which the plastic fibre-composite component is subject, there is a need for the profile cross section to vary over the length of the profile, this is conventionally produced by applying additional prepreg layers to the profile obtained after the pultrusion process, using a manual lamination process. An additional adhesive film may possibly also be required. This is a highly costly and time-consuming manufacturing process. In this case, both costs and manufacturing time are wasted not only by the manual lamination process itself but also by the prior treatment, that is required for this purpose, of the basic profile before the application of the additional fibre-composite layers. This prior treatment is carried out either by means of peel ply, which must be removed again manually from the basic profile after curing, or by grinding, waterbreak test, followed by the basic profile being dried back.

In modern aircraft construction, where fibre composites are increasingly being used not only as skin elements but also as structural components (stringers) which reinforce them, or else as bending beams, it is desirable to be able to produce plastic fibre-composite components with a profile cross section which varies over their length. By way of example, these can be used as stringers on a vertical fin whose cross-sectional thickness decreases with the aircraft vertical direction corresponding to the bending moment decreasing in this direction, or else as lateral floor supports with cross-sectional thickness increasing towards the ends, corresponding to the forces that occur.

A further object of the invention is to provide an improved method for production of a plastic fibre-composite component of the type mentioned initially. A further aim is to provide a prefabricated scrim for carrying out an improved method such as this. A final aim is to provide a semi-finished product for production of a plastic fibre-composite component in the form of a profile with a profile cross section which varies over its length.

Also provided is a plastic fibre-composite component which is produced using the above-describe method.

Also provided is a prefabricated scrim for carrying out the above-described method.

Furthermore provided is a semi-finished product for production of a plastic fibre-composite component in the form of a profile having a profile cross section which varies over its length, in which a basic profile and the varying profile cross section are formed from one or more material layers which are continuous over the length, by means of one or more further material layers, which is or are applied to the basic profile and is or are connected to it, of a length which occupies only a portion of the length of the profile, with the material layers being pressure-bonded using the pultrusion process, wherein the further material layers which form the varying profile cross section of the composite component are applied with the interposition of a separating layer to the continuous material layers which form the basic profile, and together with at least one compensation layer, which supplements the profile cross section to form a constant cross section in that part of the length of the profile which is not occupied by the further material layers, in which case the at least one compensation layer can be removed after the pressure-bonding process.

BRIEF DESCRIPTION OF THE DRAWINGS

The present invention will be explained in more detail in the following text with reference to preferred embodiments and using the attached figures, in which.

In the figures, like reference numerals refer to identical or functionally identical components unless otherwise stated.

DETAILED DESCRIPTION OF THE INVENTION

A first embodiment of a production method for a workpiece composed of a fibre-composite material will be explained in the following text with reference to FIGS. 1a to 1d, 2a to 2c and 3a to 3c.

Figure 1A:
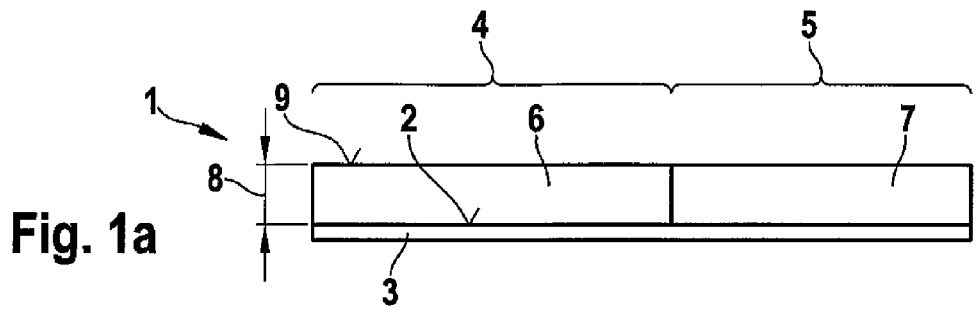
FIGS. 1a to 1d show two blank moulds for use in an embodiment for production of a workpiece.
Figure 1B:
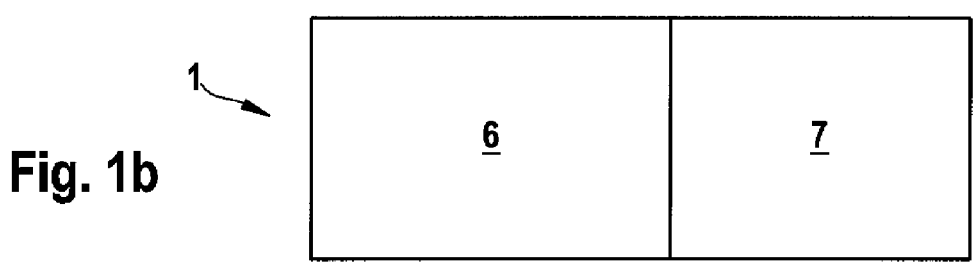

A first blank mould 1 is illustrated in the form of a side view and a plan view in FIGS. 1a and 1b. The material for production of the desired workpiece—referred to in the following text as the main material 6—is applied in a first area 4, and a secondary material is applied in a second area 5, to a surface 2 of a film 3 which is used as a support means. The entire surface 2 of the film 3 may be covered by the first area 4 and the second area 5.

The main material 6 may be a pre-impregnated fibre semi-finished product (prepreg), for example having fibres composed of carbon. The pre-impregnated fibre semi-finished product can be applied to the surface 2 in the first area 4 by machine or in an automated form by means of a laying device, a so-called tape layer.

The secondary material 7 can be applied by a laying device in the second area 5 in the same way. A fibre semi-finished product with glass fibres is particularly suitable for use as the secondary material. In the uncured state, the main material 6 and the secondary material 7 therefore have similar ductile characteristics, which advantageously do not differ significantly for a subsequent pressing process. Furthermore, the secondary material 7 may be a rapid-curing material.

The thickness 8 of the secondary material 7 and of the main material are constant and of the same magnitude over the entire size of the blank mould 1. This results in the blank mould 1 having a planar surface 9.

Figure 1C:
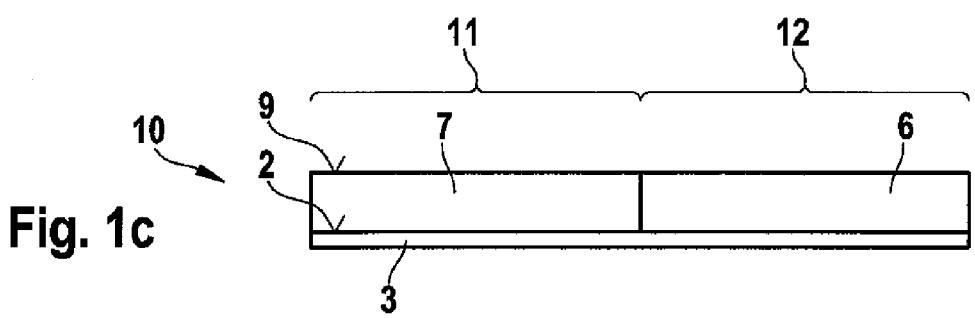
Figure 1D:
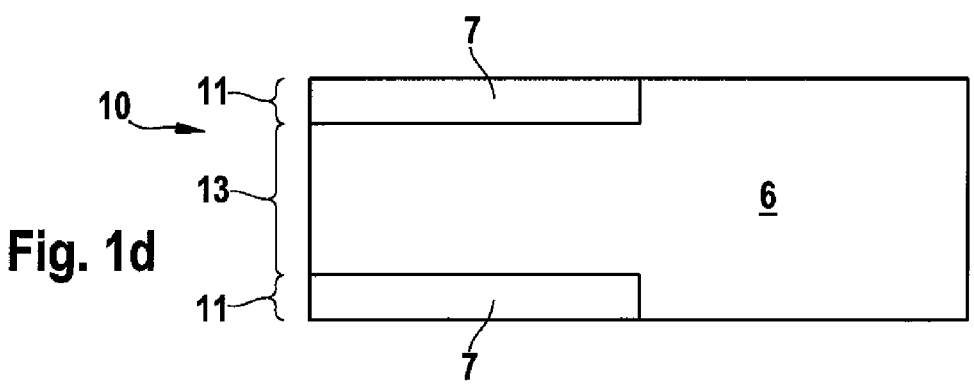

FIGS. 1c and 1d illustrate a second blank mould 10, which is likewise prefabricated from the film 3, the main material 6 and the secondary material 7. As can be seen in the plan view in FIG. 1d, the third area 11, in which the secondary material 7 is applied, is not integral, but can be arranged distributed over the surface 2 of the film 3. The main material 6 is applied in the remaining areas 12, 13 of the surface 2.

Figure 2A:
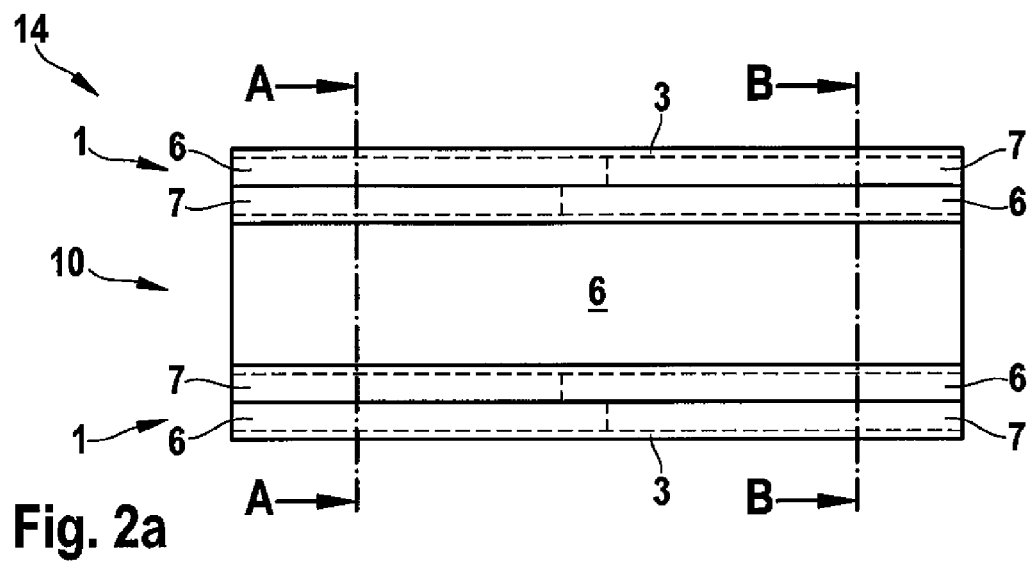
FIGS. 2a to 2c show a workpiece blank which is produced from the blank moulds shown in FIGS. 1a to 1d according to the first embodiment.
Figure 2B:
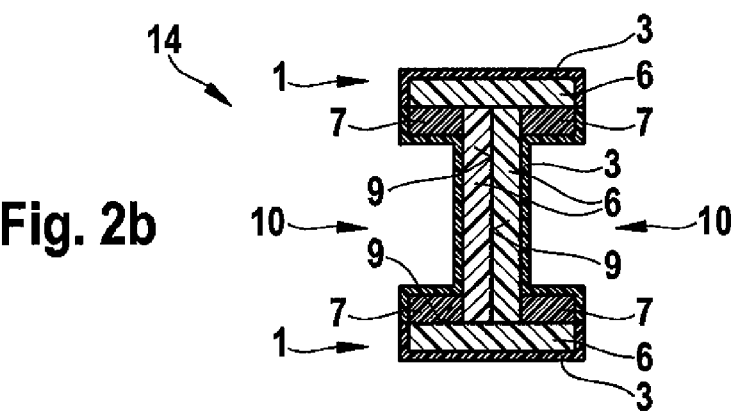
Figure 2C:
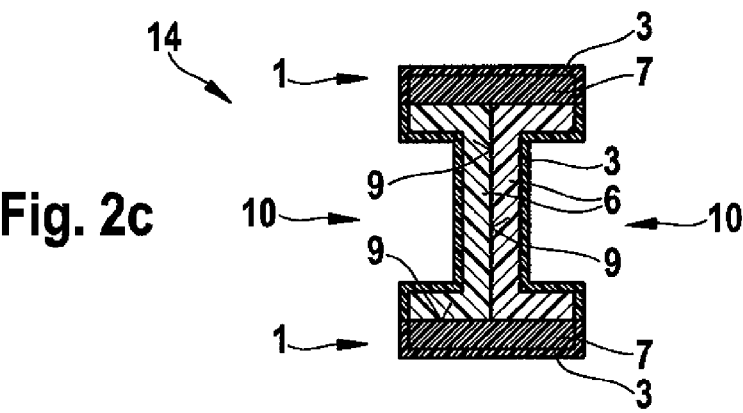
Figure 3A:
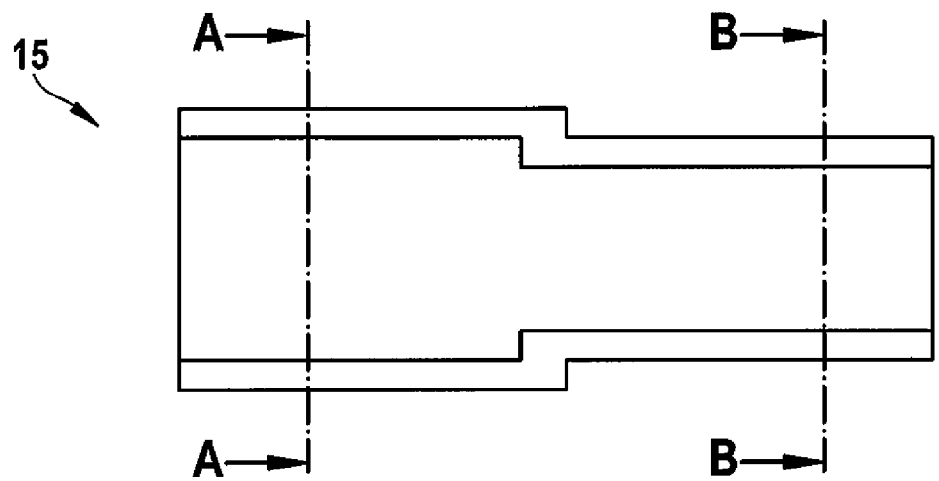
FIGS. 3a to 3c show a workpiece which is produced according to the first embodiment.
Figure 3B:
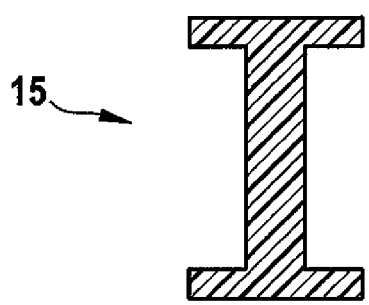
Figure 3C:
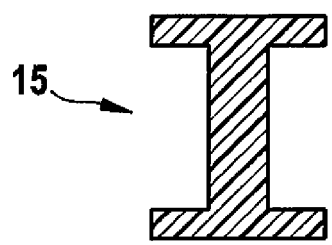

One workpiece blank 14 is formed from in each case two of the blank moulds 1, 10 described above, and is illustrated in the form of a side view and two cross-sectional views along the planes A and B in FIGS. 2a, 2b and 2c.

In this exemplary embodiment, the two second blank moulds 10 are angled downwards along their longitudinal edge, that is to say in the direction of the film 3. The two second blank moulds 10 which have been profiled in this way are arranged at the rear with their surfaces 9 facing one another. The first blank moulds 1 are arranged with their surfaces 9 facing the angled longitudinal edges on the left-hand and right-hand angled longitudinal edges of the second blank moulds 10. This results in the cross section of the workpiece blank 14 with a double-T shape, as illustrated in FIGS. 2b and 2c. The workpiece blank 14 is covered by the film 3 along its external surface.

The blank moulds 1, 10 are now pressure-bonded to one another, so that the blank moulds 1, 10 are adhesively bonded to one another by means of the main material 6. The secondary material 7 should be chosen such that it is not connected to the material 6 in an adhesive or other manner during the pressing process. Furthermore, it is advantageous for the secondary material 7 to have the same ductile characteristics as the material 6, in order that the cross section of the workpiece blank 14 is not deformed during the pressure-bonding process.

In a modification of the first embodiment, a separating layer, for example a film, can be inserted between the secondary material 7 and the main material 6. This advantageously prevents connection of the two materials 6, 7.

In a subsequent step, the film 3 and the secondary material 7 are removed. This results in the workpiece 15 as is illustrated in conjunction with FIGS. 3a to 3c in the form of a side view and cross sections along the planes A and B. As can be seen by comparison of the two cross sections, the described first embodiment allows a workpiece 15 to be produced which has a varying cross section. This advantageously allows the dimensions of a longitudinal support, stringer or similar components to be matched to the design requirements, without any need for manual subsequent processing of the workpiece 15. Furthermore, only one tool is required for pressure-bonding of the blank moulds 1, 10 to form the workpiece blank 14, since the workpiece blank has a constant cross section over its entire length.

The workpiece 15 is then cured in the normal manner. This can be done by the influence of pressure and/or heat.

In another embodiment, the tool blank 14 is cured. In this case, it has been found to be advantageous for the secondary material 7 to cure quickly, so that the time required for production of the workpiece 15 is increased only insignificantly. The cured secondary material 7 is then removed from the main material 6, which has likewise been cured.

The first embodiment as described above can be modified in many ways. In particular, all geometric shapes and cross sections of the workpiece 15 which can be thought of are possible. A plurality of different workpiece blanks are illustrated in the form of side views and corresponding cross sections in the following text. The correspondingly produced workpiece as well as the blank moulds that are required for this purpose can be derived from the appropriate figures by simple geometric considerations.

Figure 4A:
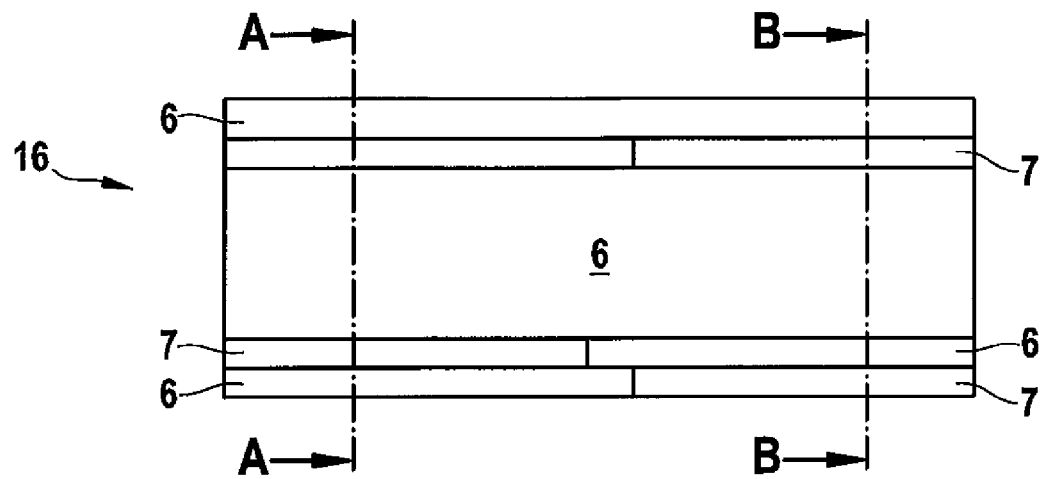
FIGS. 4a to 4c show a workpiece blank which is produced according to a second embodiment.
Figure 4B:
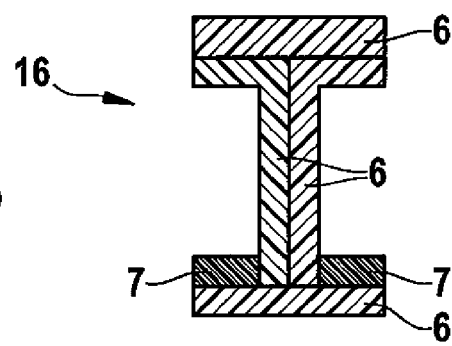
Figure 4C:
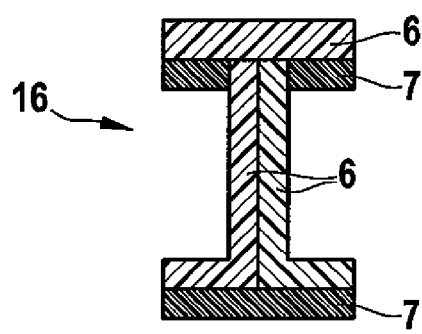

FIGS. 4a to 4c show a workpiece blank 16c which has a thicker transversely located structure in the upper area in the cross section A than in the lower area of the same cross section. The film 3 is not shown, in order to simplify the illustration. However, in the same way as in FIGS. 2a to 2c, it surrounds the entire circumference of the workpiece blank 16.

Figure 5A:
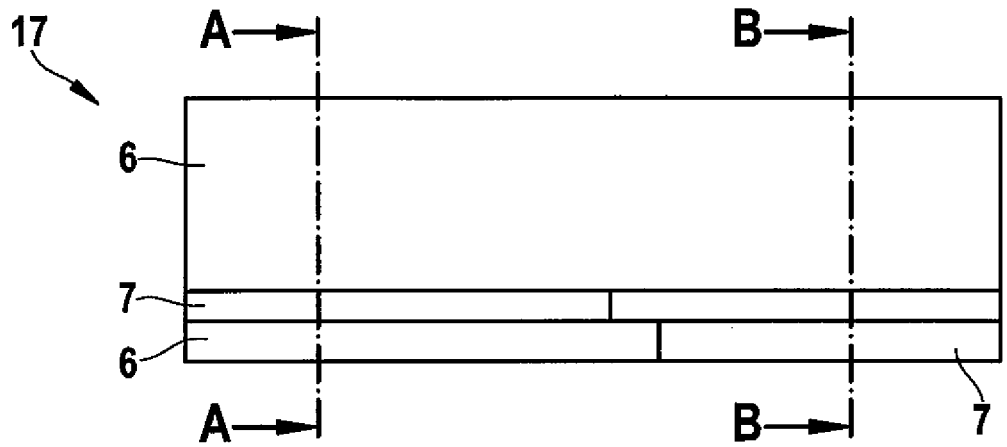
FIGS. 5a to 5c show a workpiece blank which is produced according to a third embodiment.
Figure 5B:
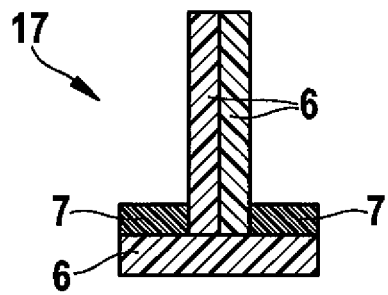
Figure 5C:
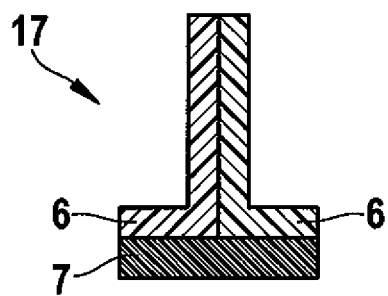

FIGS. 5a to 5c show a workpiece blank 17 whose cross section has a simple T-profile. This workpiece blank 17 may be produced either by being formed from three blank moulds, or else by first of all producing a workpiece blank in the form of a double-T, as shown in FIGS. 2a to 2c or 4a to 4c, and then cutting it along its longitudinal axis.

Figure 6:
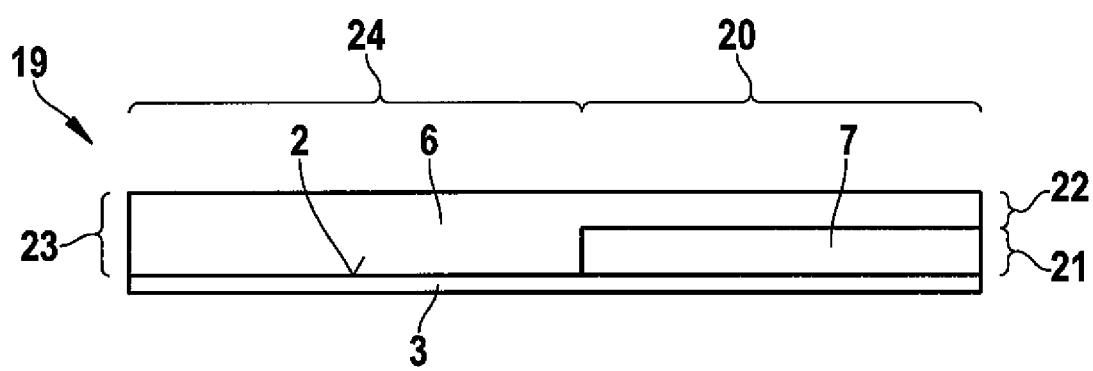
FIG. 6 shows a blank mould in order to illustrate a fourth embodiment.

A second embodiment of the method for production of a workpiece will be explained in conjunction with FIGS. 6, 7a to 7c. FIG. 6 shows a blank mould 19 which is applied to a film 3. In a first area 20, the secondary material 7 is applied directly to the film 3 with a thickness 21. The secondary material 7 is furthermore covered by a further individual layer composed of the main material 6, with a thickness 22. This results in the blank mould 19 being constructed in individual layers from the secondary material 7 and the main material 6. The essential feature in this case is that no main material 6 is arranged between the secondary material 7 and the film 3. Otherwise, it would no longer be possible to at least partially remove the secondary material 7.

By way of example, only the main material 6 is applied to the film 3 in a second area 24 in the illustrated embodiment. The thickness of the individual layers 21, 22 and 23 is chosen such that the thickness of the blank mould 19 is constant over its entire length.

Figure 7A:
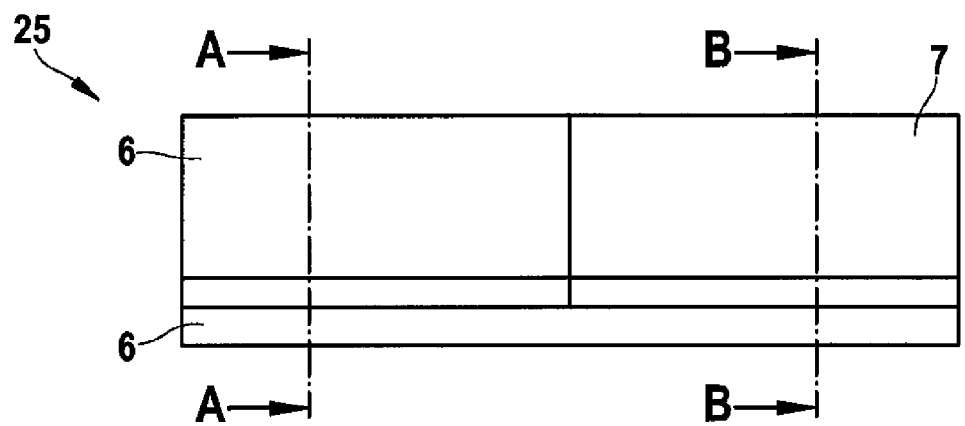
FIGS. 7a to 7c show a workpiece blank which is produced according to the fourth embodiment.
Figure 7B:
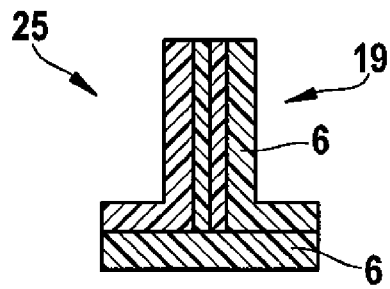
Figure 7C:
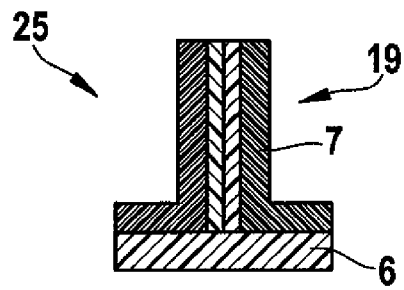
Figure 8A:
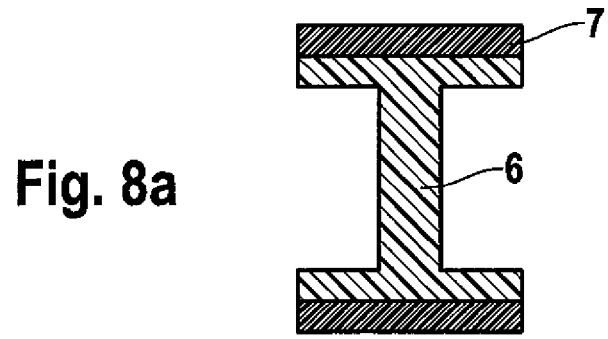
FIGS. 8a to 8d show cross sections through further workpiece blanks which are produced according to other embodiments.
Figure 8B:
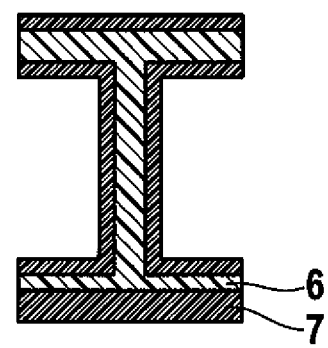
Figure 8C:
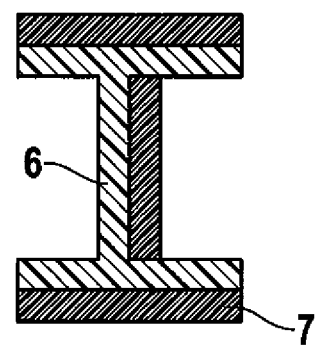
Figure 8D:
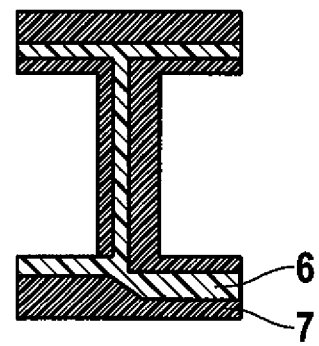

The workpiece blank 25 is produced from the blank mould 19 using a second blank mould. In this case, by way of example, the second blank mould is composed of the main material 6. The two first blank moulds 19 are angled along one edge, as is shown in FIG. 7b. The use of blank moulds 19 in which the thickness 22 of the material 6 is reduced in areas 20 by means of a secondary material 7 located underneath it allows the production of workpiece blanks 25 and, in a corresponding manner, of workpieces with any desired strengths of the material 6. In a corresponding manner, the workpiece has freely variable wall thicknesses.

FIGS. 8a to 8d show various cross sections which can be produced by means of the embodiments and blank moulds already described. Once again, it should be noted that the cross section of the workpiece blank may be the same in all cross sections.

Figure 9:
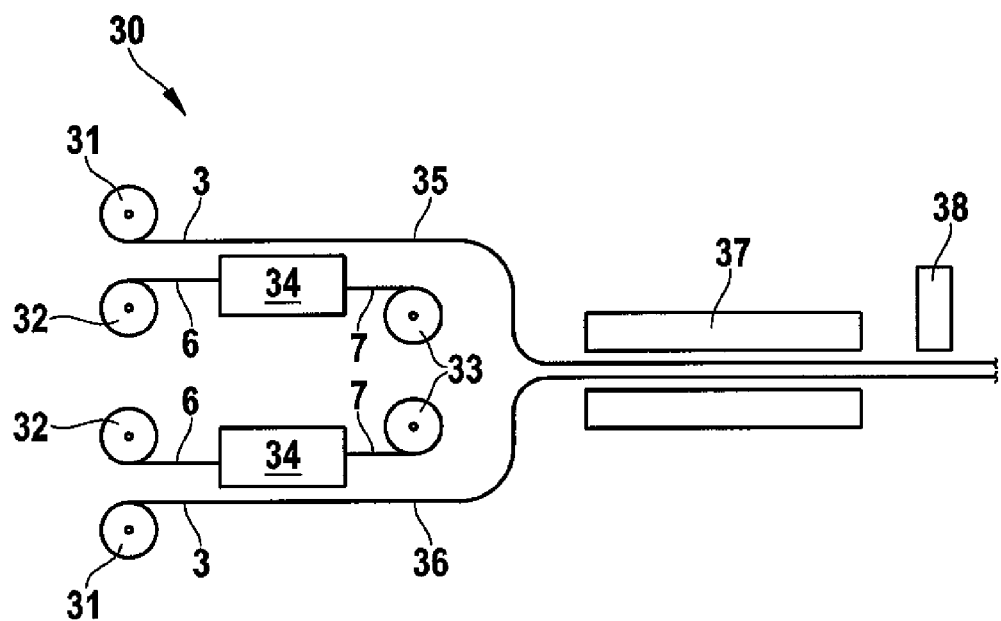
FIG. 9 shows an embodiment of an apparatus for production of a workpiece.

FIG. 9 schematically illustrates one embodiment of an apparatus for production of a workpiece. The apparatus 30 has a supply device 31 for a film 3 and any other support means. Furthermore, two further supply devices 32, 33 are provided, for the main material 6 and the secondary material 7, respectively. The support means 3 is guided along a laying device 34, which applies the main material 6 and the secondary material 7 to the surface of the support means 3. The two materials 6, 7 can be applied, and the production of a blank mould 35, 36 can thus be carried out, as a continuous process.

The two blank moulds 35, 36 are guided parallel to one another and are introduced into a pressing device 37. Once the entire blank mould 35, 36 has been arranged in the pressing device 37, the two blank moulds 35, 36 are pressure-bonded to one another by the pressing device. This results in the shape of the workpiece blank being stamped in by the pressing device.

The pressing device 37 is followed by a separating device 38. The separating device 38 removes the secondary material from the workpiece blank. For this purpose, the film 3 is removed from the workpiece blank. During this process, the secondary material 7 may also be detached from the workpiece blank.

Figure 10:
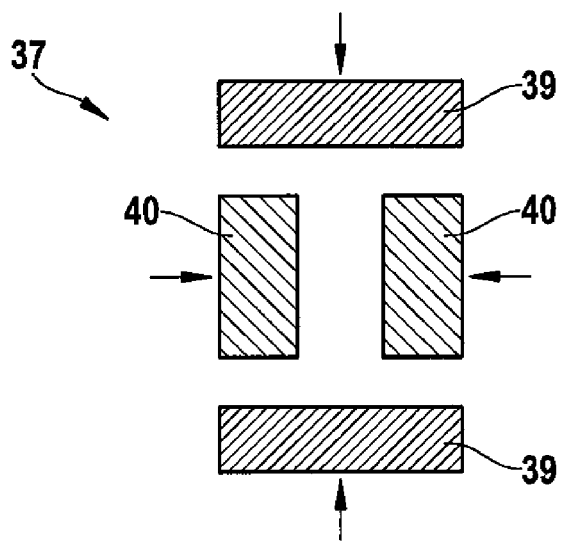
FIG. 10 shows a detailed view of a moulding press from FIG. 9.

FIG. 10 shows an example of a cross section through a pressing device 37. This device 37 has jaws 39 and 40 which are in each case arranged in pairs opposite one another. A cavity is formed, corresponding to the width and length of the jaws 39, 40, and corresponds to a double-T profile.

The workpiece blanks shown in FIGS. 2a to 2c can be produced by means of this illustrated pressing device 37.

Figure 11A:
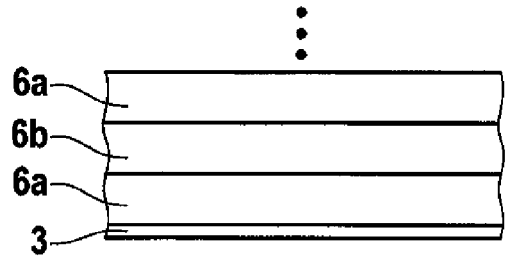
FIGS. 11a to 11c show a multilayer fibre-composite material for use in one of the embodiments.
Figure 11B:
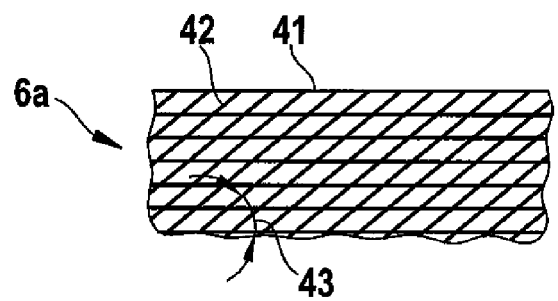
Figure 11C:
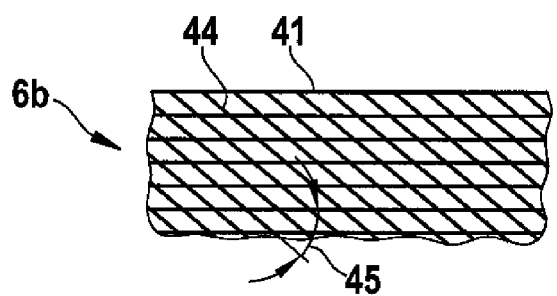

The structure of the material 6 on the film 3 for one particular embodiment will be described in conjunction with FIGS. 11a to 11c. The material is applied in successively following individual layers 6a, 6b. An individual layer 6a has a lower layer fibre 41, which is arranged along a main direction. Two fibres 42 are arranged on this, at an angle 43 to the first fibres 41. The angle is typically in the range between 30° and 60°.

The fibres in the second individual layer 6b in turn have first fibres 41, which are arranged along the main direction. The second fibres 44 arranged on them are at an angle 45 to the main direction of the first fibres 41. The second angle 45 may be designed such that the third fibres 44 are arranged with mirror-image symmetry about the second fibres 42, with respect to the first fibres 41. In this case, the angle 45 has the opposite mathematical sign to the angle 43.

The sequence of the individual layers 6a, 6b of the main material 6 ensures that, when the individual blank moulds are pressure-bonded, no fibres which lie parallel to one another come to rest on top of one another. In a situation such as this, these fibres could slide into one another, which would reduce the thickness of the workpiece blank in an undesirable manner at this point.

Figure 12:
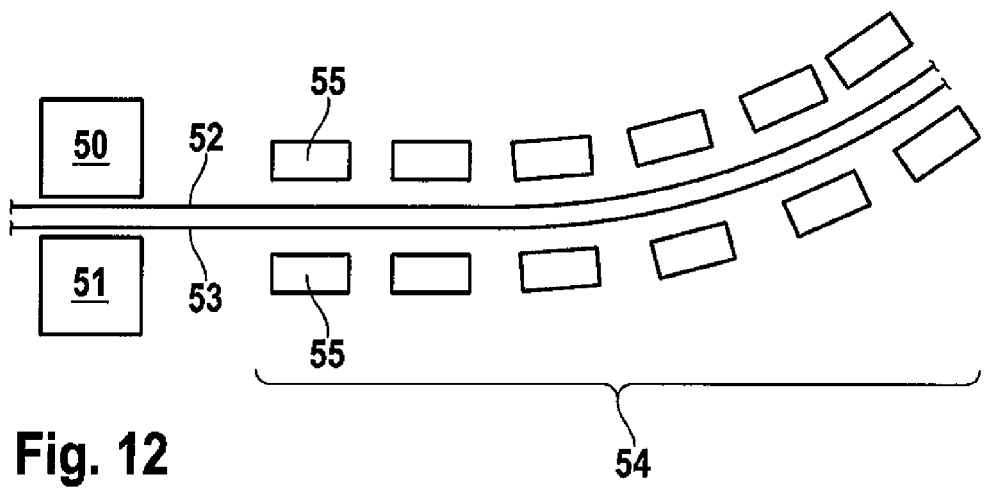
FIG. 12 shows a second embodiment of an apparatus for production of a workpiece from fibre-composite materials.

FIG. 12 shows a further embodiment of an apparatus for production of a workpiece. The figure schematically illustrates two production devices 50, 51 for the blank moulds 52, 53. The production devices 50, 51 guide the blank moulds 52, 53 to a pressing device 54. The pressing device 54 is composed of a plurality of individual pressing moulds 55, which are each arranged in pairs opposite one another. The spatial arrangement of the pressing moulds 55 in pairs follows a predetermined curved profile, as illustrated in FIG. 12. The positions of the individual pressing moulds and of their pairs can be adjusted for this purpose. The pressing apparatus 54 allows workpiece blanks with any desired curvature to be produced.

It is self-evident that, in the case of curved workpiece blanks, the fibre materials of the inner blank mould 52 may be compressed. The inner blank mould 52 is that blank mould which has a smaller radius of curvature than the blank mould 53 located opposite it. The compression of the fibres leads to weakening of the mechanical characteristics of the completed workpiece.

This is counteracted by producing the two blank moulds 52, 53 with different lengths. The lengths of the two blank moulds 52, 53 are matched to the lengths which result along the two opposite surfaces in the finished workpiece. The inner blank mould 52 is thus shorter than the outer blank mould 53.

The production devices 50, 51 for this purpose may insert the two blank moulds 52, 53 into the pressing device 54 at different feed rates. This is done such that the starts and the ends of the two blank moulds 52, 53 arrive in the pressing device 54 at the same time.

The invention is not restricted to the embodiment described above.

In particular, the only necessity is for the blank moulds to have a constant thickness over their length, although their thickness can vary over the width of the blank moulds. Workpieces of different design to T-shaped or double-T-shaped workpieces can also be produced.

In the described embodiments, the blank moulds are produced as elements that are separate from one another. In one embodiment, which is not described, however, it is also possible to provide a single support means. The support means is subdivided into blank-mould areas. The dimensions of the blank-mould areas correspond essentially to those of the separate blank moulds described above. The main material and the secondary material are applied to the respective blank-mould areas in a corresponding manner to the separate blank moulds. Before pressure-bonding of the blank-mould areas to form the workpiece blank, the support means is then folded or broken along the boundaries of the blank-mould areas.

Figure 13:
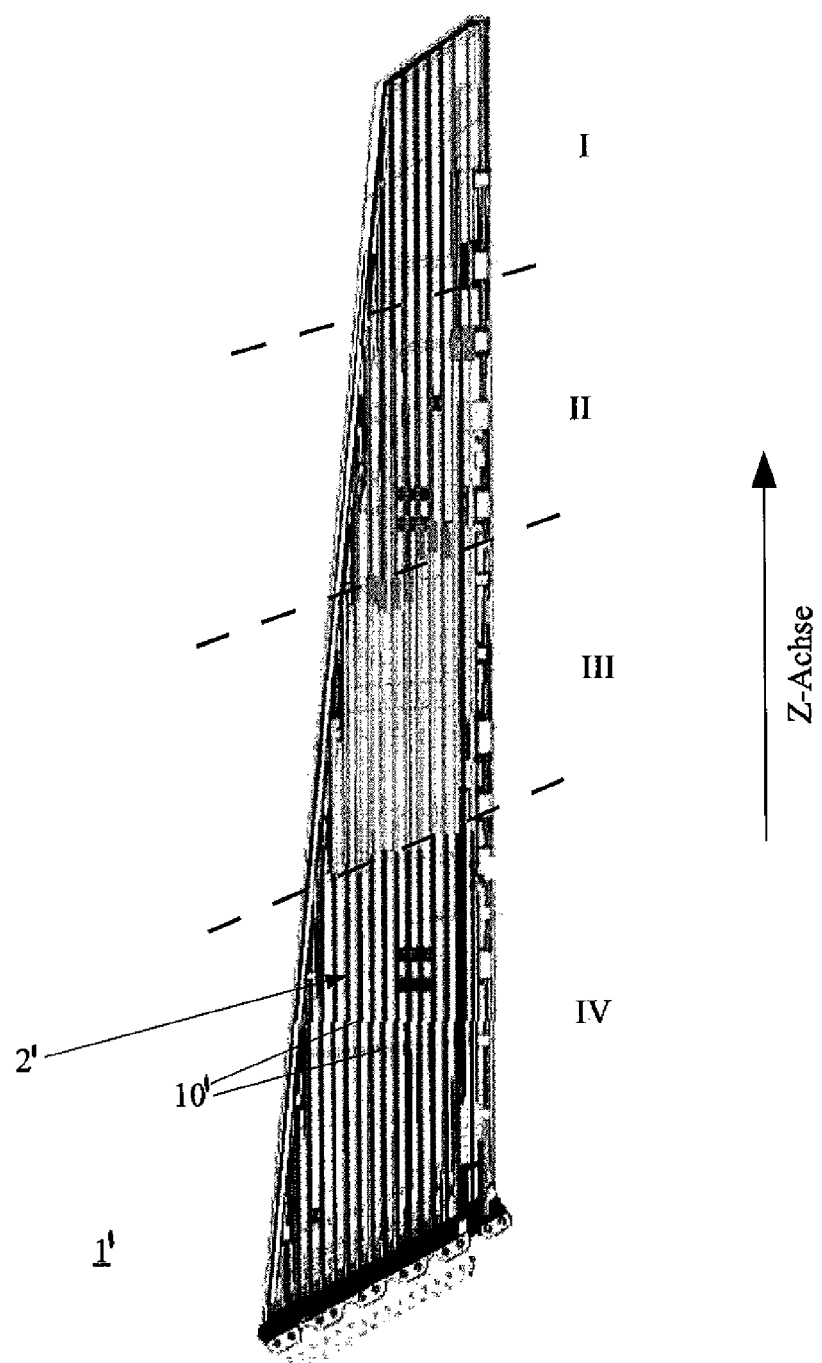
FIG. 13 shows a perspective view of the inside of a half-shell of a vertical fin of an aircraft, which has been produced using a fibre-composite structure, with an outer skin being supported by a number of stringers running parallel to one another in the vertical axis direction of the aircraft, with the stringers having been produced as plastic fibre-composite components in the form of a profile with a profile cross section which varies over its length, according to one exemplary embodiment of the invention.

FIG. 13 shows a perspective view of the inside of a half-shell of a vertical fin of the A380 wide-body aircraft. A number of stringers 10', which extend parallel to the aircraft vertical axis direction Z and are each formed by a plastic fibre-composite component, are arranged in the half-shell 1'. The stringers 10' stiffen the external skin 2', which is connected to the stringers 10' over their entire length. The stringers 10' as well as the external skin 2' of the illustrated half-shell 1' are produced in particular using carbon fibres, in the modern plastic fibre-composite structure. The plastic fibre-composite components which form the stringers are in the form of an elongated profile with a T-shaped cross section, and with a profile cross section which varies over its length. The profile can be produced with virtually any desired cross-sectional shape, for example first of all with an H-shaped cross section, which is cut through along its length in order to produce two profile elements, each having a T-shaped cross section, or the like.

FIG. 13 shows four areas I to IV, which correspond to an increasing cross-sectional thickness of the profile of the stringers. The plastic fibre-composite component 10' is thinnest in the area I, with this thickness being formed by a basic profile which extends over the entire length of the composite component 1'. The cross-sectional thickness increases from the area II by first reinforcement, which extends over the areas II to IV. Second reinforcement is added in the area III, and extends only over the areas III and IV. Finally, the composite component 10' is thickest in the area IV as a result of a third reinforcement layer. The cross section of the plastic fibre-composite components which form the stringers 10' is therefore matched to the bending load which decreases in the direction of the aircraft vertical axis direction Z as the extent of the vertical fin increases.

Figure 16:
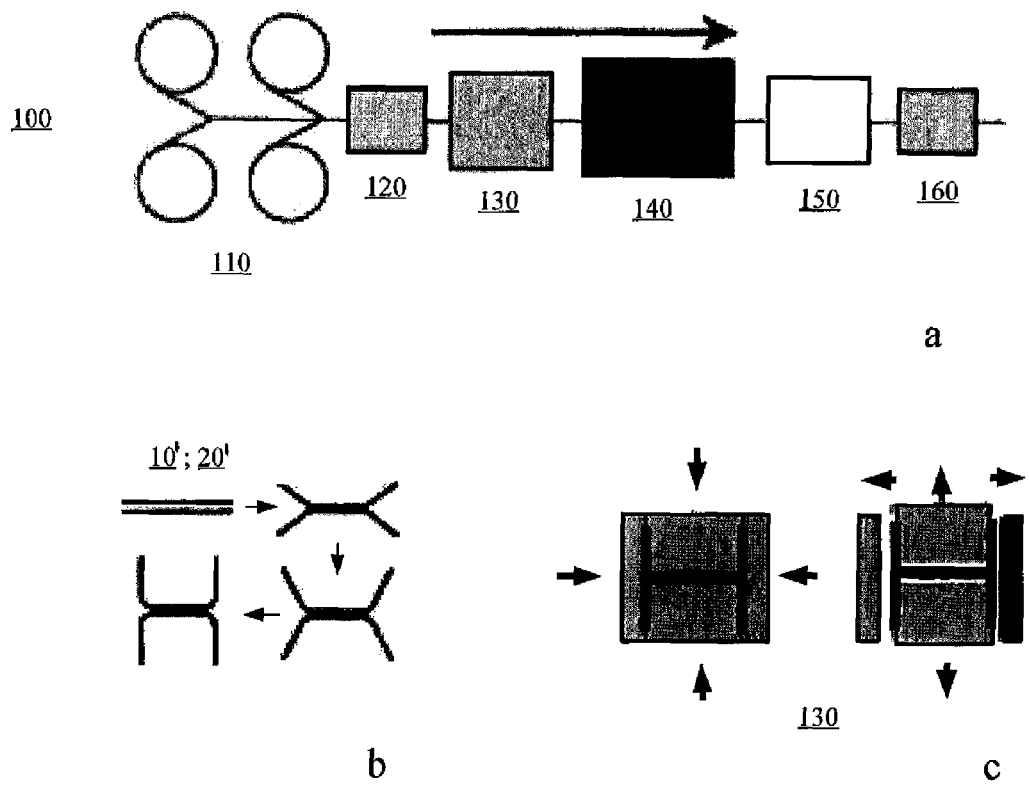
FIG. 16a shows a schematic illustration of a pultrusion installation which is known from the prior art.
FIG. 16b shows various phases in the successive formation of the desired profile from a prefabricated scrim.
FIG. 16c shows a pressing tool in which the prefabricated scrims are pressure-bonded to one another under the influence of pressure and heat to the desired profile shape, as known from the prior art.

FIG. 16a shows a schematic illustration of a pultrusion installation 100, which is known per se from the prior art and is used to produce plastic fibre-composite components 10'; 20' in the form of profiles. The material layers to be processed are stored in the form of prepreg materials, wound up onto rolls 110 as prefabricated scrims, are joined together in a pre-forming device 120, and are pressure-bonded to one another in a pressing tool 130, under the influence of pressure and heat. Heat treatment is carried out in a tunnel oven 140 which follows the pressing tool, in order to completely cure the fibre composite. The prefabricated scrim is drawn through the installation by a pulling device 150. The profiles are cut to the desired length in a cutting device 160.

The desired profile is formed successively in the preforming device 120 by changing the prefabricated scrims, as shown in the various phases in FIG. 16b, from a configuration in the form of a strip, in which they run off the rolls 110, to the finally desired shape. The prefabricated scrims are then pressure-bonded to one another in the downstream pressing tool 130 under the influence of pressure and heat to form the desired profile shape, as is shown in FIG. 16c. By way of example, as shown, a profile with an H-shaped cross section is produced during this process, which can be used with this profile or can be cut through along its length in order to produce two profile elements, each having a T-shaped cross section.

Figure 14:
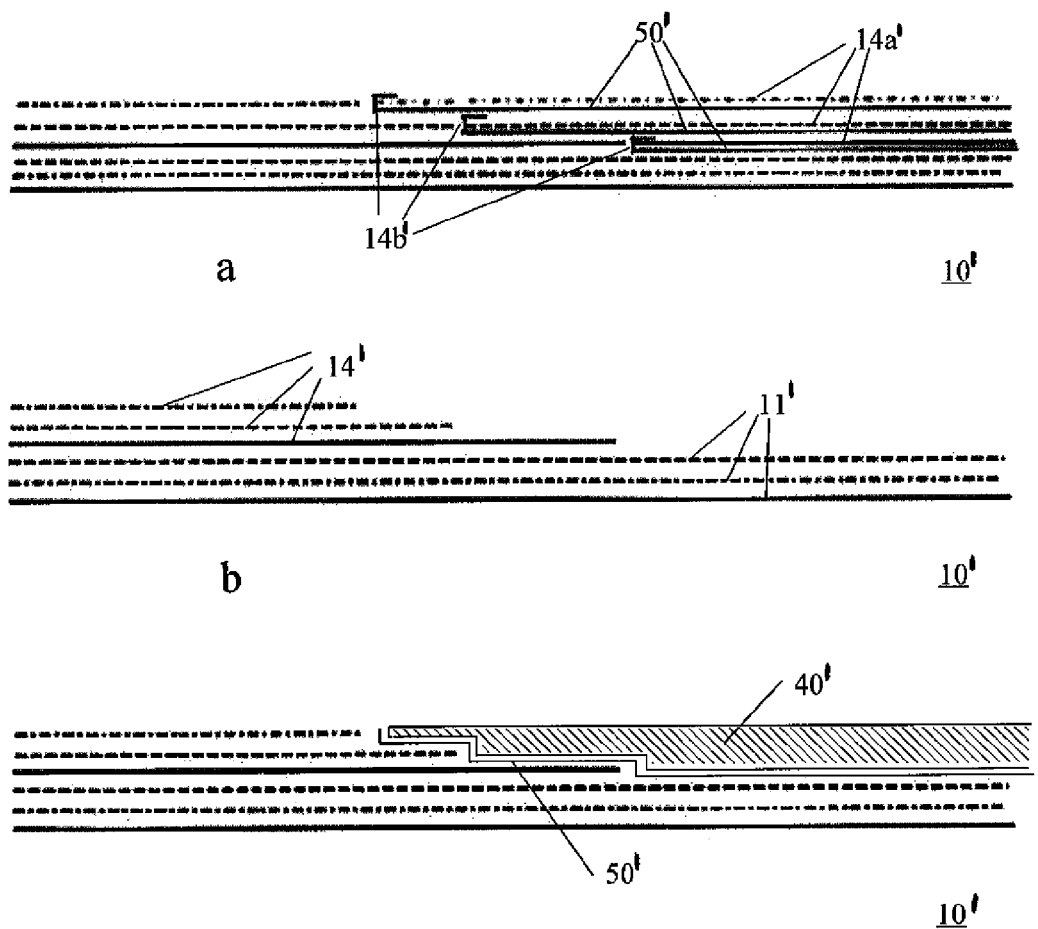
FIGS. 14a to 14c show schematic cross-sectional views of a part of a plastic fibre-composite component in the form of a profile with a profile cross section which varies over its length, which is produced by means of a pultrusion process, according to two exemplary embodiments of the invention.
Figure 15:
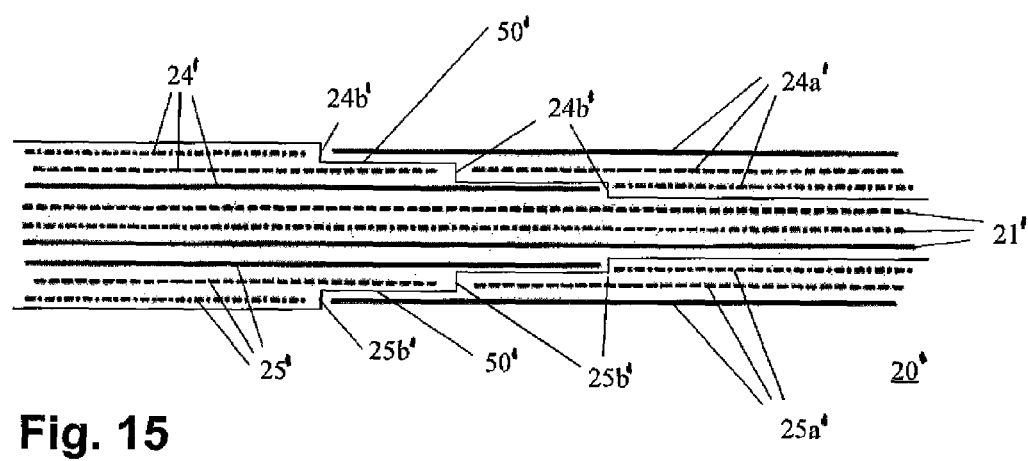
FIG. 15 shows a schematic cross-sectional view of a plastic fibre-composite component in the form of a profile with a profile cross section which varies over its length, which are produced by means of a pultrusion process, according to a further exemplary embodiment of the invention.

FIGS. 14 and 15 show cross-sectional views of two different exemplary embodiments of plastic fibre-composite components 10'; 20', which have been produced in the form of a profile with a profile cross section varying over their length, using the pultrusion process. These each have a basic profile which is formed from one or, in the case of the illustrated exemplary embodiments, typically a plurality of material layers 11'; 21' which are continuous over its length.

The profile cross section, which varies over the length of the profile, is in each case produced by one or, in the case of the illustrated exemplary embodiments, likewise a plurality of further material layers 14'; 24', 25' which are applied to the basic profile and are connected to it. These have a length which occupies only a portion of the length of the profile so that this results in the desired profile cross section, which varies over its length.

These further material layers 14'; 24', 25' are applied to the continuous material layers 11'; 21' which form the basic profile, together with the respective compensation layers 14a'; 24a', 25a' which first of all supplement the profile cross section, which is desired in the end effect and varies over the length, in that portion of the length of the profile which is not occupied by the further material layers 14'; 24', 25', to form a profile cross section which is constant over the length of the profile. This makes it possible to use the pultrusion process to produce a semi-finished product which has a constant cross section over its length, as is also the case with conventional pultrusion processes.

A separating layer 50' is arranged between the compensation layers 14a'; 24a', 25a' and the continuous material layers 11'; 21', which are located underneath them and form the basic profile, and the further material layers 14'; 24', 25', which form the profile cross section which varies over its length, when the compensation layers 14a'; 24a'; 25a' are located above them, which makes it possible to remove the compensation layers 14a'; 24a'; 25a' at a suitable time after the pressure-bonding process and curing, with the purpose of the compensation layers 14a'; 24a'; 25a' being to ensure a constant cross section during the pultrusion process, although they are not intended to be a component of the final product in the form of the plastic fibre-composite component 10'; 20' with a profile having a profile cross section which varies over its length. FIG. 14 shows a schematic cross-sectional view of the fibre-composite component 10' which results after the removal of the compensation layers 14a'.

The exemplary embodiments which are illustrated in FIGS. 14 and 15 show a plurality of further material layers 14'; 24', 25', which form the profile cross section which varies over the length, and which further material layers 14'; 24', 25' abut against one another at respective abutment points 14b'; 24b', 25b' with corresponding compensation layers 14a'; 24a', 25a'. These abutment points 14b'; 24b', 25b' are offset with respect to one another in the longitudinal direction thus resulting in stepped tapering of the desired cross-sectional profile. In this case, respective overlap areas of the further material layers 14'; 24', 25' which form the varying profile cross section and of the respectively following compensation layer 14a'; 24a', 25a' of the respectively next individual layer are produced between adjacent abutment points. In order to allow the compensation layers 14a'; 24a', 25a' to be removed subsequently, separating layers 50' can also be provided in each of these overlap areas.

In the exemplary embodiment illustrated in FIG. 14, the continuous material layers 11' are arranged on one side of the profile, and the compensation layers 14a' to be removed are located on the other side of the profile. In the exemplary embodiment illustrated in FIG. 15, on the other hand, the composite component 20' is designed to be symmetrical about its longitudinal axis, the continuous material layers 21' are located in the centre, further material layers 24' are provided on one side of the profile, even further material layers 25' are provided on the other side of the profile, and these are in each case supplemented by corresponding compensation layers 24a' and 25a', respectively, on both sides of the continuous material layers 21'. The removable compensation layers 24a', 25a' are therefore provided on both sides, and the profile of the composite component 20' varies on both sides, over its length.

According to the exemplary embodiments illustrated in FIGS. 14a and 15, the compensation layers 14a'; 24a', 25a' are formed by individual layers of a fibre material which may be the same as the fibre material of the continuous layers 11'; 21', or may be a different fibre material. It is either possible to provide for separating layers 50' to be provided between each of the individual layers of the compensation layers 14a'; 24a', 25a', as is illustrated in FIG. 14a, or for no separating layers to be provided between the individual layers of the compensation layers 24a', 25a', as is shown in FIG. 15, so that the compensation layers 24a', 25a' form an autonomous, further plastic fibre composite after the pressure-bonding process. This fibre composite can be thrown away as a sacrificial layer, once it has been removed.

For all of the exemplary embodiments, the separating layer 50' may be provided in the form of an anti-adhesion powder or in the form of a separating film, or else, if required, in some other suitable manner.

The continuous material layers 11'; 21' may be stored in the form of a prefabricated scrim wound up on one or more rolls, and may be supplied to the process for production of the composite component 10'; 20'. The further material layers 14'; 24', 25', which are intended to form the profile cross section which varies over the length of the profile, and the compensation layers 14a'; 24a', 25a' which supplement them can likewise be stored in the form of a prefabricated scrim wound up on one or more rolls, and can be supplied to the process. In this case, the further material layers 14'; 24', 25' on the one hand and the compensation layers 14a'; 24a', 25a' which supplement them on the other hand can each be supplied from different rolls. In this case, it would be necessary to ensure that the abutment points 14b'; 24b', 25b' between the mutually supplementing layers are positioned correctly with respect to one another.

On the other hand, the further material layers 14'; 24', 25' which form the varying profile cross section and the compensation layers 14a'; 24a', 25a' which supplement them may be wound up jointly in the form of a prefabricated scrim with a constant cross section on one roll, and may be used for the method. In addition, it is possible to provide for at least one of the continuous material layers 11'; 21' to also be wound up on a roll together with these layers to form a prefabricated scrim with a constant cross section. In the case of profiles whose cross-sectional thickness is not excessively large, it is even possible for all of the layers, that is to say the continuous material layers 11'; 21' as well as the further material layers 14'; 24', 25' which form the profile cross section which varies over its length, and the compensation layers 14a'; 24a', 25a' which supplement them to be wound up together in the form of a prefabricated scrim with a constant cross section on a single roll.

The prefabricated scrim may additionally contain a support film, which supports the respective layers. A support film such as this is normally detached from these various layers while these various layers which are supplied from different rolls are being drawn together, and is removed from the process.

If a separating film is used as the individual separating layer, this may either be a component of the prefabricated scrim, or may be supplied separately, in which case it is normally then also wound up on a roll.

As is shown in FIG. 14c, a single compensation layer 40' can also be provided, which is in the form of a complementary part for the profile cross section which varies over its length. By way of example, this may be composed of metal or of an elastic material. It is then used during the process in the same way as the individual layers described above to supplement the profile cross section, which varies over its length as a result of the further layers 14a'; 24a', 25a', to form a profile cross section which is constant over its length. An element 40' such as this may either be a reusable "dummy layer", which is carried along in the production process, and is then removed, cleaned and reused, or it could also be an element which is thrown away after the process or is recycled in a suitable manner. The element 40' can be supplied to the production process shortly in front of the curing tool, particularly if it is in the form of a hard "dummy layer".

The plastic fibre-composite component 10'; 20' with a profile cross section which varies over its length, and the compensation layers 14a'; 24a', 25a'; 40' which supplement it form a semi-finished product, which can be transported or stored in its own right, until these two components are separated.

The plastic fibre-composite component according to the invention and its production method, as well as the said semi-finished product offer a large number of advantages over conventional methods for production of such parts using the pultrusion process, specifically a considerable saving in costs and time for production, avoidance of the need for complex application of additional reinforcing layers and possibly adhesive film onto the basic profile, including omission of prior treatment which may be necessary in this case, avoidance of any additional autoclave process for such application of additional reinforcing layers, a better laminate quality and thus better mechanical performance by the composite component obtained, and the lack of test effort for the basic profile.

The profile cross section which varies over the length also offers the production advantage of a pultrusion profile whose weight is optimized and which is matched to the load.

Traditional pultrusion profiles have been distinguished by a profile cross section which is constant over their length, and by a constant component thickness. As long as the profile cross section remains constant over the length, any form of geometry (H, T, o, X, V, M, D, etc.) can be produced. The invention is distinguished in that this basic geometry can be retained, and in that the profile cross section can be varied in its component thickness. There are essentially no restrictions to the basic geometry.

All conventional materials such as CFP, GFP, AFP, natural fibres, etc., may be used as the fibre material.

The invention claimed is:

1. A production method for a workpiece composed of a fibre-composite material, the method comprising:
   (a) providing two first supports and two second supports;
   (b) fitting of a main material composed of a pre-impregnated fibre semi-finished product and of a secondary material to the two first supports and the two second supports in order to form two first mould-blank areas and two second mould-blank areas in such a manner that each of the mould-blank areas comprises the main material and the secondary material, wherein each of the mould-blank areas has a varying cross section in a longitudinal direction of the mould-blank area, and wherein each of the mould-blank areas has a first cross section in a first portion of the mould blank area and a second cross section in a second portion of the mould-blank area, the first and the second portions being spaced apart from each other in the longitudinal direction of the mould-blank area;
   (c) pressure-bonding of the two first mould-blank areas and the two second mould-blank areas to form a workpiece blank in such a manner that the two first supports and the two second supports are provided on a surface of the workpiece blank, wherein the two second mould-blank areas are arranged at a rear with surfaces facing one another, and the two first mould-blank areas are arranged with surfaces facing longitudinal edges of the second mould-blank areas, wherein one of the first mould-blank areas is arranged facing first longitudinal edges of the second mould-blank areas, and the other one of the first mould-blank areas is arranged facing second longitudinal edges of the second mould-blank areas, and wherein the workpiece blank has a same cross section throughout a longitudinal direction of the workpiece blank; and
   (d) removing the two first supports and the two second supports and the secondary material from the workpiece blank in order to form the workpiece, wherein the workpiece has a varying cross section in a longitudinal direction of the workpiece, and wherein the workpiece has a first cross section in a first portion of the workpiece and a second cross section in a second portion of the workpiece, the first and second portions being spaced apart from each other in the longitudinal direction of the workpiece.

2. The production method according claim 1, wherein the main material is in the form of a woven fabric, a knitted fabric and/or a scrim.

3. The production method according to claim 2, wherein the scrim is formed from an even number of layers, in whose odd-numbered layers first fibres are aligned in a first direction and in whose even-numbered layers second fibres are aligned in a second direction, with the first direction being aligned at an angle of between 30° and 60° to the second direction.

4. The production method according to claim 3, wherein the first direction of the fibres of all of the odd-numbered layers is the same, and the second direction of the fibres in the immediately successive odd-numbered layers is arranged with mirror-image symmetry with respect to one another about the first direction.

5. The production method according to claim 1, wherein the two first supports and the two second supports are in the form of a film.

6. The production method according to claim 1, wherein the main material is a material which has carbon fibres and/or the secondary material is a semi-finished product which has glass fibres.

7. The production method according to claim 1, wherein, before pressure-bonding, a first of the mould-blank areas is arranged parallel to a second of the mould-blank areas, and these two mould-blank areas are then pressure-bonded to one another.

8. The production method according to claim 7, wherein the first mould-blank area and the second mould-blank area are pressure-bonded corresponding to a curve.

9. The production method according to claim 7, wherein the first mould-blank area is produced with a first length and the second mould-blank area is produced with a second length, with the first length corresponding to the length of the first mould-blank area after the pressure-bonding process, and with the second length corresponding to a length of the second mould-blank area after the pressure-bonding process.

* * * * *